United States Patent [19]
Hewlett

[11] Patent Number: 5,529,606
[45] Date of Patent: Jun. 25, 1996

[54] OXIDATION PROCESS AND THE SEPARATION OF METALS FROM ORE

[75] Inventor: Richard F. Hewlett, Ridgecrest, Calif.

[73] Assignee: Benjamin V. Knelson, Langley, Canada

[21] Appl. No.: 330,627

[22] Filed: Oct. 28, 1994

[51] Int. Cl.⁶ .............................. C22B 3/04; C22B 3/42
[52] U.S. Cl. .................................. 75/743; 75/744
[58] Field of Search .............................. 75/710, 743, 744

[56] References Cited

U.S. PATENT DOCUMENTS

| | | | |
|---|---|---|---|
| 2,915,380 | 12/1959 | Hilty | 75/525 |
| 3,734,714 | 5/1973 | Kozak | 266/227 |
| 4,191,563 | 3/1980 | Smartt | 75/568 |
| 4,772,320 | 9/1988 | Van Linden | 266/227 |
| 5,087,379 | 2/1992 | Morton et al. | 210/748 |

Primary Examiner—Melvyn Andrews
Attorney, Agent, or Firm—Larson and Taylor

[57] ABSTRACT

An oxidation process uses an inclined raceway which has a plurality of longitudinally spaced transverse riffles across the raceway so that a slurry of water and particles to be oxidized runs over the raceway in turbulent flow to a catchment tank at the bottom end of the raceway. The material is recirculated over the raceway every two to three minutes for a period of two to six hours. The oxidation process can be used in conjunction with heating and vibration of the raceway to oxidize the particles. The oxidation process is particularly used in the separation of metals from ores in which after oxidation leaching agents including bromide and chlorine compounds are added to the mixture during the recirculation over the raceway to leach the metals in soluble salts from the particles. Ion exchange systems are used using known resins to extract the metals from the liquid after the recirculation system is complete.

27 Claims, 4 Drawing Sheets

OXIDATION PROCESS AND THE SEPARATION OF METALS FROM ORE

The present invention relates to an oxidation process which is particularly but not exclusively designed for use in a process for separating various metals from ores.

BACKGROUND OF THE INVENTION

The leaching of metals as soluble salts from various ores and techniques for separation of those salts from the pregnant liquid are well known. Many such leaching processes however require initial oxidation of the ore to oxidize the sulfides content of the ore and to release the metal salts. In other cases reduction of the salts in the slurry is required before the oxidation and subsequent leaching can occur.

Techniques for oxidation of the ore have long been appreciated as a problem area in the separation of the metals and most solutions have involved massive capital equipment and high inputs of energy for the purposes of heat and pressure oxidation.

For example Lakshmanan (in the 14th Annual CIM Hydro Metallurgical Meeting in Timmons, Ontario) disclosed techniques for roasting of refractory ores at high temperatures for purposes of oxidizing the sulfides and carbonaceous matter so that the resulting calcine residue is permanable and therefore amenable to cyanidation, that is the recovery of gold and silver by forming a cyanide complex.

The same reference discloses pressure oxidation which is used for refractory precious metal ores where a slurry of the concentrate is contacted with oxygen in an autoclave at elevated temperatures and pressures. Sulfides are oxidized to sulfur and/or sulfates, releasing the precious metals for cyanidation.

Another similar process disclosed is the Ontario Research Foundations Atmospheric Hydro Metallurgical Oxidation Process where "Caro's Acid" (Peroxymonosulphuric Acid $H_2SO_5$) is used to oxidize the refractory ore and then the oxidized pulp is further treated with cyanide to leach the gold and silver.

Chlorine Oxidation is used at the Carlin and Jeritt Canyon mills in Nevada to treat carbonaceous ores. The ore is slurried and then aerated at moderate temperatures in the presence of soda as to decompose soluble sulfides and some carbonaceous matter. This is followed by chlorine oxidation of the more refractory organic hydrocarbons. The resulting pulp is then treated with cyanide to recover the gold/silver.

Homestake Mining Company's McLaughlin gold project in Napa County, Calif. utilizes pressure oxidation of refractory sulfides and initially treated 2,700 tons-per-day of refractory gold ore. The process chemistry of the elevated temperature oxidation of the sulfides involves the formation of iron sulfate and sulfuric acid and the trivalent arsenic is oxidized to the ferric and arsenate states. Also, elemental sulfur is produced as well as jarosites. This technique is disclosed in a paper entitled Gold Extraction from Refractory Concentrates 14th Annual CIM Hydro Metallurgical Meeting, Timmons, Ontario by Robert Weir.

Peruvian mines utilize Pressure Oxidation of silver bearing sulfide flotation concentrates similar to the process used by Barrick at Mercury and Gold Strike mines. Problems encountered are 1) Excessive heat generation, 2) Silver solubility during autoclaving, and 3) Formation of pellets containing unreacted sulfides. This is disclosed in a paper entitled Pressure Oxidation of Silver Bearing Sulfide Flotation Concentrates SME Annual Meeting Pre-Print No. 92-59, by P. Thompson.

The United States Bureau of Mines holds a patent on a process for recovering nickel, iron and copper and gold and the platinum group metals from sulfide ore concentrates by the following:

1) Smelting with a flux to form a matte (copper-nickel sulfides).

2) Dry grinding of the matte (–200 mesh).

3) First Stage Leaching; Sulfuric Acid leaches the nickel and iron. Iron is removed by precipitation with ammonia after oxidation to ferric state. The nickel is removed by hydrogen reduction.

4) Second Stage Leaching; Ferric chloride, ferric sulfate, and cupric chloride is used. The copper is precipitated with $H_2S$. The residue contains the precious/noble metals which are then processed.

Stillwater Mining Company in Montana operates an underground platinum-palladium mine and they make a sulfide concentrate by flotation and they then smelt the concentrates in a submerged-arc electric furnace and a top-blown rotary converter. The exhaust gases go directly to the scrubber and then cleaned in a dual-alkali wet scrubber to remove the sulfur dioxide before venting to the atmosphere.

Other processes for refractory gold ore are as follows:

1) Electrooxidation; producing sodium hypochlorite by electrolysis of brine to be used as an oxidant.

2) Hydrochloric acid-oxygenate leach of copper-nickel sulfide concentrates.

3) Ferrous chloride-oxygen leach of sulfide concentrates.

4) Microbial treatment of refractory ores with bioreductive bacteria.

5) Vacuum Liquidation Process can be used for selective recovery of tungsten-molybdenum-silver.

The limitations of the prior art technology are as follows:

1) Very high capital investment for pyrometallurgical treatment of concentrates.

2) High unit operating costs for pyrometallurgical treatment of concentrates.

3) Existing pyro-and-hydro metallurgical processes are inflexible and usually require a cyanide final leach.

SUMMARY OF THE INVENTION

It is one object of the present invention therefore to provide an improved method of oxidation of particles.

It is a further object of the present invention to provide a method of oxidizing particles which is effective for use in oxidizing particles prior to leaching of metals from the particles of ore.

According to one aspect of the invention there is provided a method of oxidizing particles comprising mixing the particles with water to form an acreous slurry; providing a downwardly sloping raceway having an upper end and a lower end; providing a catchment tank at the lower end; for a time period, continuously pumping the slurry from the catchment tank to the upper end such that, during the time period, the slurry repeatedly flows over the raceway to the catchment tank; and providing on the raceway a plurality of longitudinally spaced riffles thus generating turbulent flow in the slurry on the raceway; and communicating the turbulent flow with oxygen so as to oxidize the particles.

According to a second aspect of the invention there is provided a method of separating metals from ore comprising providing the ore in particle form; mixing the particles with water to form an aqueous slurry; providing a downwardly sloping raceway having an upper end and a lower end; providing a catchment tank at the lower end; for a time period, continuously pumping the slurry from the catchment tank to the upper end such that, during the time period, the slurry repeatedly flows over the raceway to the catchment tank; and providing on the raceway a plurality of longitudinally spaced riffles thus generating turbulent flow in the slurry on the raceway, and communicating the turbulent flow with oxygen so as to oxidize the particles; adding leaching compounds to form the metals into soluble salts; decanting the slurry from the catchment tank into a settling tank and causing the particles to settle from the water and the soluble salts in the settling tank; separating the water and soluble salts from the settling tank and extracting the soluble salts from the water.

Surprisingly the technique of the present invention provides oxidation of ores in particle form up to the required level of oxidation for use in the leaching processes. Up till now these oxidation requirements have been solved by the high pressure, high temperature techniques previously described which involved high capital cost and ongoing energy costs. Surprisingly, therefore, the natural turbulent flow technique of the present invention provides oxidation up to the levels required with little energy input and in many cases simple and inexpensive equipment. The same raceway arrangement can also be used in a prior reduction process if required using reduction agents such as Sulfurous acid.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
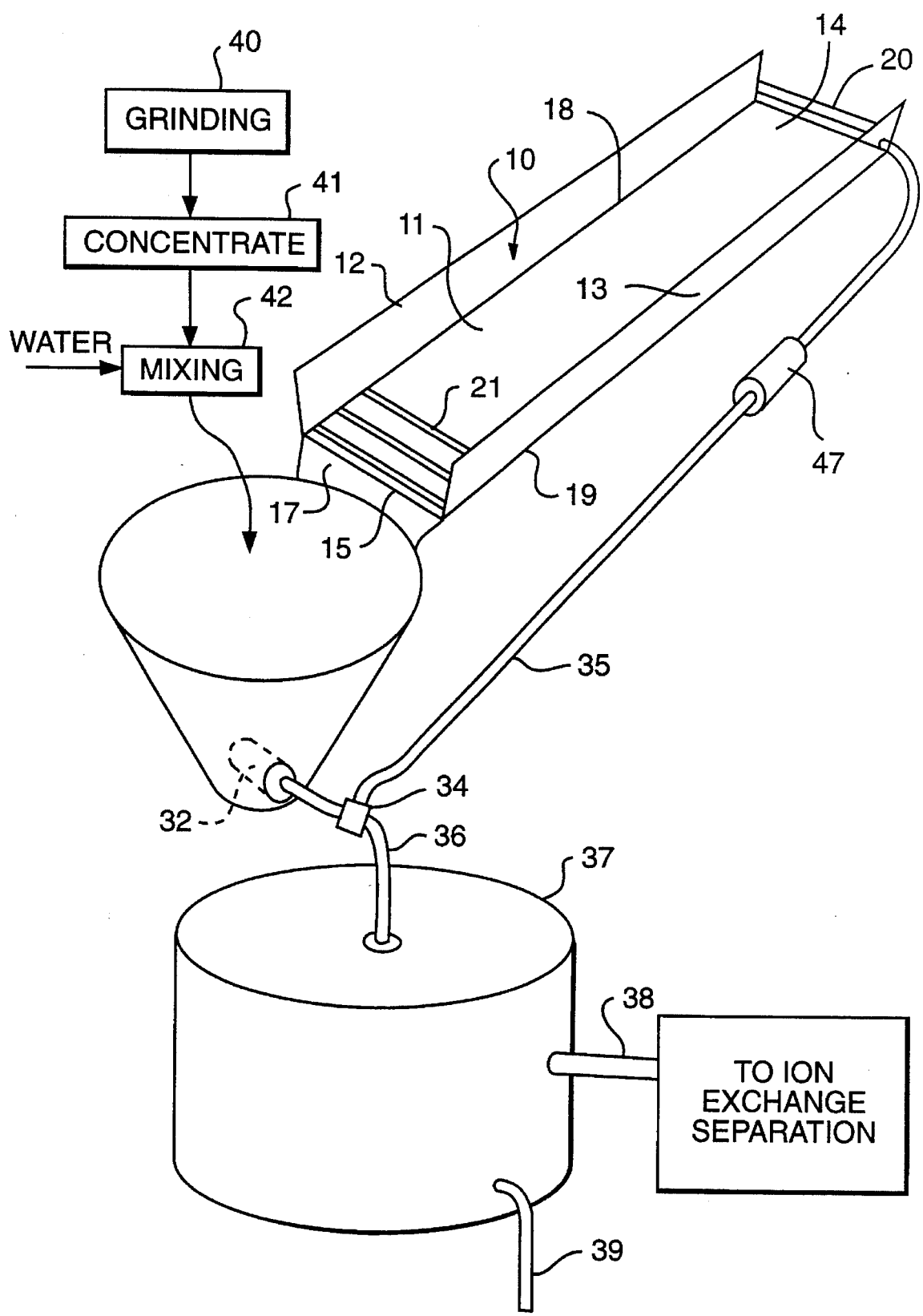
FIG. 1 is a schematic illustration of the reaction raceway system of the present invention for oxidation and settlement of the particles.
Figure 2:
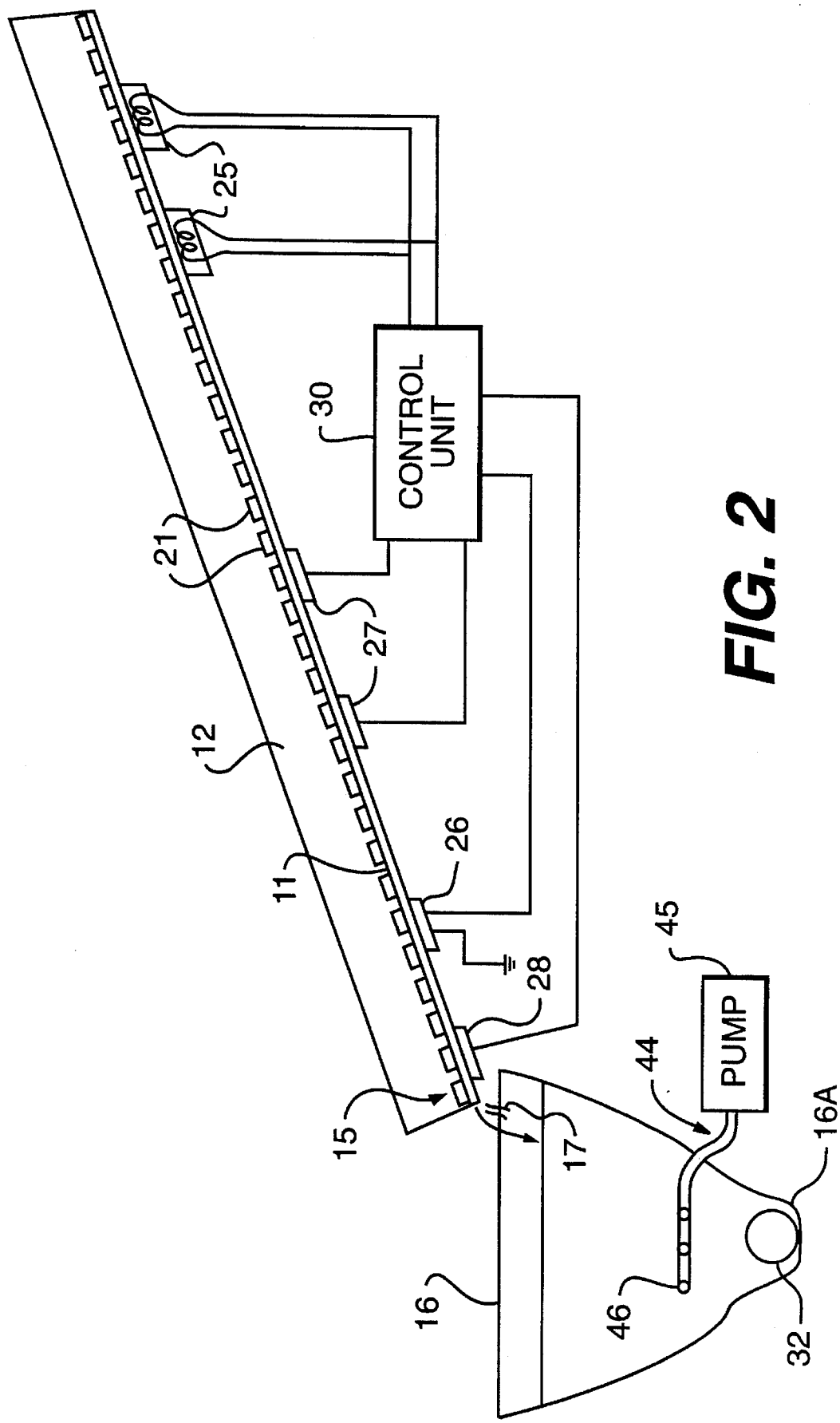
FIG. 2 is a longitudinal cross sectional view through the raceway and catchment tank of FIG. 1.
Figure 3:
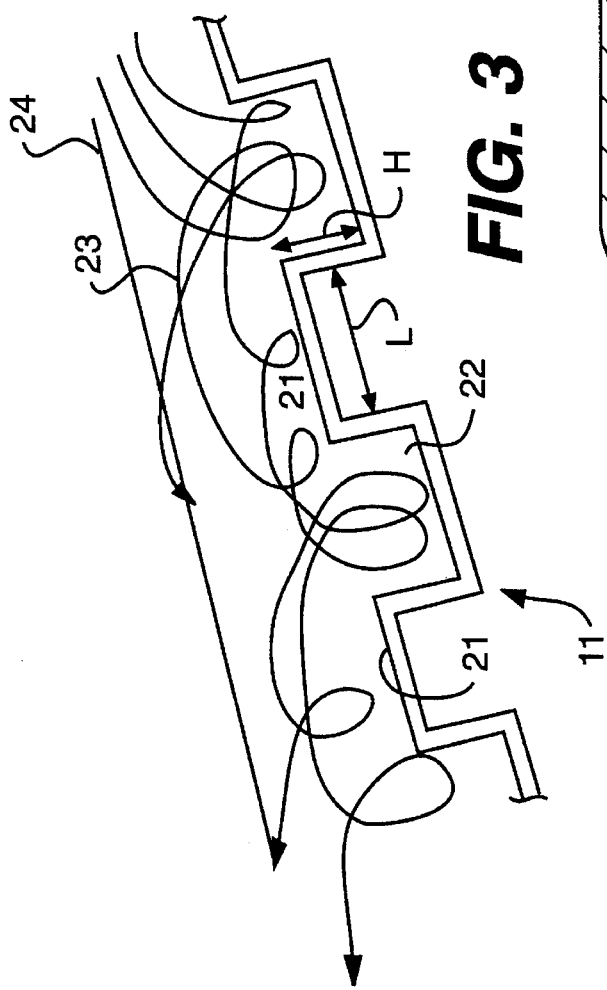
FIG. 3 is a longitudinal cross sectional view on an enlarged scale showing a portion only of the raceway.

The apparatus shown in FIGS. 1, 2 and 3 comprises an inclined raceway 10 having an inclined base wall 11 and side walls 12 and 13 confining slurry to run along the base wall 11 from an upper end 14 to a lower end 15. The lower end 15 is provided a catchment tank 16 and a guide system 17 for guiding the slurry from the lower end 15 into the catchment tank as it discharges from the lower end 15.

The base wall 11 has parallel sides 18 and 19. A discharge duct 20 is arranged at the upper end 14 so as to discharge the slurry across the full width of the base wall so that the slurry runs down the base wall from the upper end to the lower end in a layer across the base wall.

As an alternative to the duct 20, a hydrocyclone (not shown) can be used with the overflow being returned to the catchment tank and the underflow fed onto the raceway as the feed therefor.

The base wall is formed with a plurality of raised ribs or riffles 21 with each riffle extending across the full width of the base wall and each riffle being spaced from the next adjacent riffle by a recess 22. The full length of the base wall is covered with the riffles at substantially equal distance spacing along the base wall from the upper end 14 to the lower end 15.

The riffles are shown in FIG. 3 as of rectangular cross section but it would be appreciated that other riffle shapes can be used including riffles which are in cross section semi-circular, triangular or other polygonal shape. The riffles have a length L and a height H from the base of the recess 22 which are arranged to act upon the slurry as it passes over the riffles to form a turbulent flow that is a Reynolds number greater than 2000. This turbulent flow is shown schematically at 23 in FIG. 3 so that the slurry enters the recesses, is caused to swirl and thus swirls upwardly to break an upper surface 24 of the layer of the slurry. In practice the angle of inclination of the raceway of the order 15 to 20 degrees, preferably 17 degrees, and the slurry is supplied at a rate which provides a depth of the slurry of the order of two inches with the riffles having a height H of the order of 0.5 inches. This selection of dimensions has proven to provide the required turbulent flow of the slurry of the passage from the upper end 14 to the lower end 15.

On the under side of the raceway is provided one or more heating elements 25 which apply heat to the slurry on the raceway so that it is heated as it passes down the raceway. In addition a magnetic separator 26 is provided on the raceway. Finally the raceway includes a plurality of vibration transducers 27. The heating elements 25, the magnetic separator 26 and the vibration transducers 27, 28 are controlled by a schematically illustrated control unit 30.

Various magnetic separators can be installed on the underside of the raceway including the scalper magnetic separator, low-intensity magnetic separator, high-intensity magnetic separator and the like. These various types of magnetic separators can be used for separating magnetic materials from the ore/concentrates. The magnetic fraction can be released into a separate holding tank (not shown) after the reaction cycle is finished. This is effected by maintaining the magnetic effect of the electromagnet of the magnetic separator 26 during the reaction cycle and then releasing the magnetic effect after the reaction cycle is complete and the raceway is washed with water. If the magnetic fraction contains precious and noble metals, this fraction often requires a longer retention time than "free gold" or silver and the magnetic separator could then be left on through numerous reaction cycles, until this fraction is completely leached as described hereinafter.

The vibration transducers 27 and 28 produce vibrations in the raceway preferably at ultrasonic frequencies but also sound waves can be used. Various types of sound waves can be used to accelerate leaching and subsequent settling as described hereinafter such as high frequency, moderate frequency and low frequency.

The ultrasonic transducers are placed on the underside of the downward sloping raceway and cause an acceleration of the leaching process as described hereinafter. Some of the transducers 28 are placed near the end of the raceway just before flowing into the catchment tank 16, these are turned on at the end of the leaching cycle just prior to settling in a separate holding tank as described hereinafter for the pregnant lixiviant and/or concentrate slurry to settle. Ultrasound provided by the transducers accelerate the settling of fine particles.

The catchment tank 16 is generally conical so as to direct the slurry downwardly or maintain the slurry mixed to a lower apex 16A of the catchment tank at which is located an outlet pump 32 discharging in a duct 33. The duct 33 includes a valve 34 which can be manually or program actuated to direct the material along a return duct 35 to the feed system 20 or along a discharge duct 36 to a settling tank 37.

The dimensions of the catchment tank are arranged so that the pump continuously extracts the slurry from the catchment tank and returns it to the feed system 20. In one example the raceway and the catchment tank are arranged to accept a batch of the slurry which can be of the order of three tons with the dimensions of the various parts arranged so that the material is circulated in the time period in the order of two to three minutes so that, in a selected time period of for example ½ hour, the slurry is repeatedly passed over the raceway.

The separation tank 37 is separate from the raceway/catchment tank system and hence the settlement tank can receive the batch when completed on the raceway for settlement while a further batch is to treated on the raceway. The settlement tank includes a discharge 38 for the liquid and a second discharge 39 for the solid materials separated from the slurry for disposal.

The system includes a pulverizing or grinding system schematically indicated at 40 for pulverizing the base ore into the required particle size. The system may include a concentration system 41 which can use centrifugal forces to separate heavy materials including the metals from the gangue so that the system only operates upon a certain percentage that is a concentrate of the initial ore. The system includes a mixing system 42 for receiving water from the water supply to mix the concentrate with the required quantity of water to obtain the required particle/water mixture for operation on the raceway and to add the various reactive chemicals as described hereinafter.

The catchment tank includes an aeration system 44 including an air pump 45 and a plurality of discharge nozzles 46 within the catchment tank so that the slurry is maintained in mixed form and is aerated during its rest period in the catchment tank before it reaches the pump 32 and is returned to the feed system 20. The feed system including the pump 32 and the feed line 35 are arranged to maintain the slurry in proper suspension so that the mixture remains constant at the predetermined solids to liquid ratio.

Figure 4A:
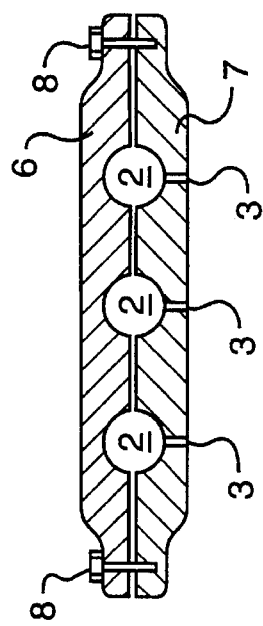
FIG. 4A is a cross sectional view along the line A—A through the slurry return duct of FIG. 4.
Figure 4:
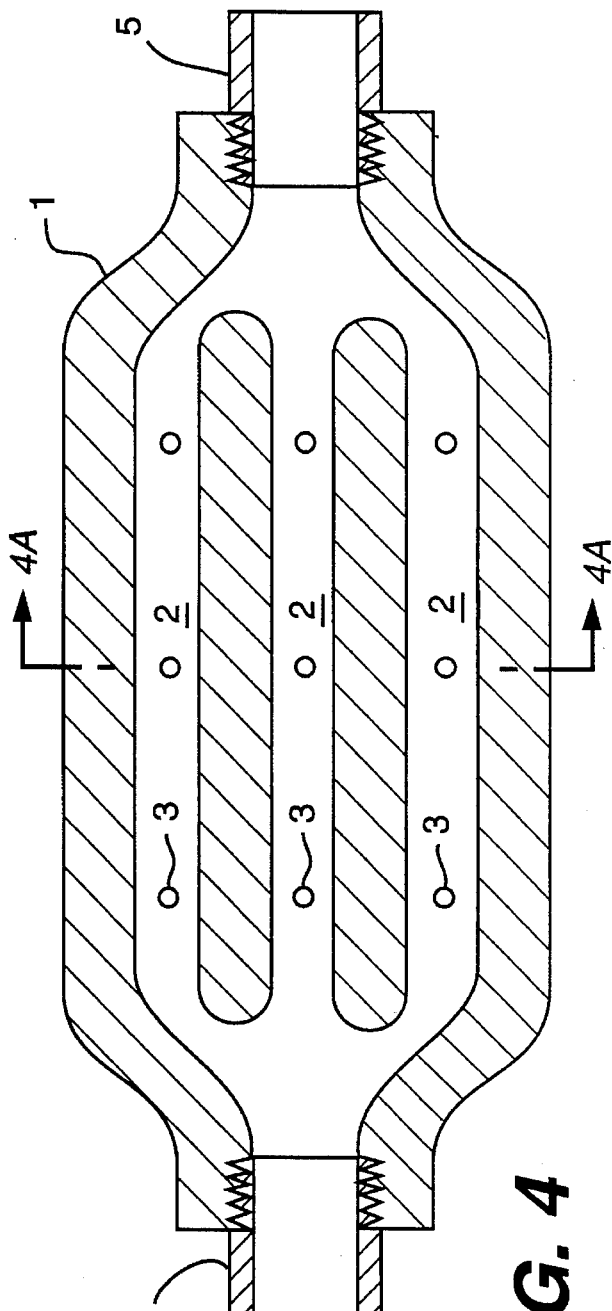
FIG. 4 is a longitudinal cross sectional view through the slurry return duct of FIG. 1.

In addition the return duct 35 includes a system indicated at 47 including velocity accelerators shown in FIG. 4 which create high turbulence and sheer forces in the duct. The slurry flow is divided into three streams and they are rotated in subsequent elements to reverse and disperse the flow creating large sheer forces which accelerate the leaching process as described hereinafter.

In FIGS. 4 and 4A is shown longitudinal and transverse cross sections respectively of the velocity accelerators 47. This comprises a elongate pair of cooperating castings 6 and 7 which are interconnected by clamping bolts 8 to define an inlet mouth at one end which receives an outlet end of a first part of the duct indicated at 4 and an outlet mouth at an opposed end for connection to a second part of the duct as indicated at 5. The casting defines three or more tubular ducts through the casting which thus increase the cross sectional area of the ducts relative to that of the inlet mouth at the pipe section 4. Preferably the cross sectional area of the ducts which are indicated at 2 should be in total twice that of the inlet duct portion 4. The outlet duct portion 5 may be of the same size as the duct portion 4 or may be reduced relative to the duct portion 4 to yet further increase turbulence. The casting includes a plurality of compressed air inlet openings 3 by which compressed air is injected into the ducts 2 to effect turbulence within the fluid flowing through the velocity accelerators 47.

The raceway as shown in FIGS. 1 and 2 is simply an inclined surface but various other arrangements of the surface can be used which may be a product of space availability. In one alternative the raceway can be divided into a number of inclined surfaces which are separated by steps so as to increase the turbulence as the slurry falls from one step to the next. In a further alternative arrangement (not shown) the steps can be arranged so that the portions of the raceway extend in opposed directions with one portion vertically above the next so as to reduce the longitudinal dimension of the system in situations where it is necessary for space requirements. The portions of the raceway remain rectangular with parallel sides.

In a further alternative (not shown), the raceway shown in FIGS. 1 and 2 can be modified so that it is oscillated at a relatively slow frequency by a mechanical oscillation system coupled to the raceway. This again can be used to increase turbulence in the flow.

Further alternatives for the shape of the raceway can include circular towers in which the surfaces comprise a plurality of cones so that the material is fed onto the apex of a first cone, moves outwardly toward an outer rim of the first cone, falls from the outer rim onto the outer rim of a second inverted cone and moves toward the apex of that second inverted cone and then repeats the process over for the plurality of such cones. Yet further alternatives includes bending the raceway into a spiral around a central post. Both of these arrangements minimize the lateral dimensions of the system, particularly if the raceway is located directly on top of the catchment tank and these arrangements may be desirable in certain circumstances where space is limited.

Process chemistry that can be used by the present system is as follows:

1) Any acid solvents such as hydrochloric or aqua regia.

2) Halide solvents such as chlorides, bromides, or iodides.

3) Cyanide, with a basic pH for special applications and no EPA restrictions.

4) Oxidation reactions; oxidation and dissolution of gold to form gold chloride, bromide or iodide.

5) Reduction reactions; reduction of refractory Psilomelane which traps gold/silver but when reduced from Mn4 to Mn2; gold and silver goes into solution in cyanide, halides or acids (Manganiferous ores). Certain refractory ores such as hematite (ferric oxide) must have the oxygen removed from the compound to produce metallic iron. This procedure is also used to liberate precious and noble metals trapped within the matrix (interstitial). The refractory ore types can first be reduced in the reaction system with such reducing agents as sulphurous acid which can be made by bubbling $SO_2$ into water. Psilomelane is a general term for mixes of manganese minerals or for a botryoidal, colloform manganese oxide whose mineral composition is not specifically determined. The $Mn^{+4}$ must be reduced to $Mn^{+2}$ in order to be soluble and allow the precious and noble metals to be leached in the next phase, the oxidization phase. Many of the reducing agents could be used and or added as "reducing boosters".

6) Reduction and then oxidation process for complex ores; or oxidation-reduction and then oxidation.

Figure 5:
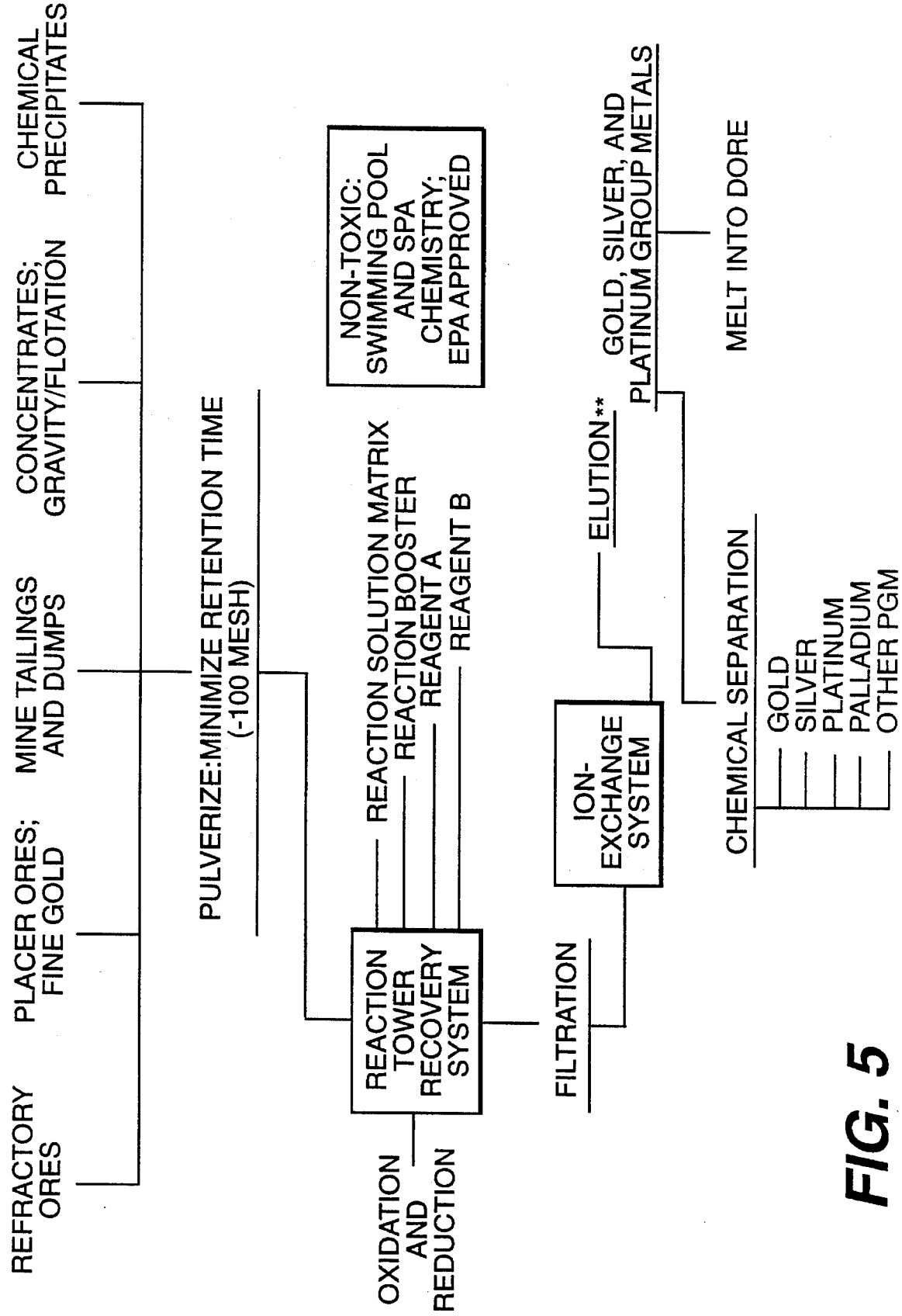
FIG. 5 is a flow chart showing the various steps in the process.

However the particularly preferred process chemistry is as follows and is set out schematically in FIG. 5.

The system can be utilized for the economic recovery of precious metals, noble metals and base metals and minerals from the following refractory ores:

1) In-manganese mineral matrix (psilomelane).
2) Admixtures with base metals (copper-lead-zinc) and (nickel-cobalt).
3) Silicates; and capsulation.
4) Graphitic-carbonaceous ores.
5) Sulfides.
6) Black sands; magnetite.
7) Calcareous encapsulation.
8) Deleterious minerals/compounds (arsenic-antimony).

Examples of all types that can be processed economically are:

1) Refractory ores.
2) Placer ores.
3) Mine tailings.
4) Concentrates.
5) Chemical precipitates.

The ore types are pulverized in for example a ball mill to liberate the economic minerals down to minus 150 mesh. The process steps are as follows:

1) The pulverized particles are mixed with water and in one particular example salt (NaCl) is added as a conditioning material to assist with the leaching. The mixture of the particles, water and salt are then passed through the raceway/catchment tank system for an initial period of time which can be of the order of ½ hour. This initial process commences initial oxidation of the particles and particularly oxidizes the sulfides of the particles generating sulfurous acid which is then oxidized to sulfuric acid. The slurry on the raceway flows over the riffles to create turbulence in contact with atmospheric oxygen in adequate supply to maintain the continuous oxidizing action.

2) After the initial processing is completed, a weak sodium hypochlorite (NaOCl) solution is added. This material consumes itself during the process releasing chlorine and oxygen which further act to oxidize the sulfides. These materials together with the oxidizing action of the raceway as previously described surprisingly obtains a complete oxidation of the sulfides thus releasing the metals for leaching.

3) The leaching process is effected by addition of a bromide compound and hydrochloric acid. In this mixture the slurry is again passed over the raceway/catchment tank system for a further period which can be up to 1 hour. This arrangement has been found to effect the required leaching action by causing formation of the gold, silver and platinum/paladium group into soluble salts and particularly chlorides/bromides.

4) The progress of the process is monitored using an atomic absorption unit which detects the amount of gold in solution in the slurry and when the amount of gold reaches a peak, the process is complete in that the leaching has been fully effected thus putting all of the metals in soluble salt form in solution in the pregnant lixiviant.

5) When the leaching is complete, the batch is transferred to the settling tank. The settling tank allows the particles to settle taking generally a period of the order of 1 hour so that the pregnant lixiviant is available for decanting and final filtration of the particles for disposal as tailings.

6) After settling, the liquid is decanted and passed through a filtering system for example diatomaceous earth filters.

7) After filtration the pregnant liquid goes to the ion/exchange columns containing suitable resins for extraction of the metals and minerals. One example is sybron SR-3 selective chelating resin. The copolymer is styrene-dvb and the active group is isothiouronium chloride. The resin has an operating capacity of 100–125 troy oz per cubic-foot of resin. Because it loads silver-gold-platinum-paladium, it is necessary to leach the silver from the pulp and recover it before or after the halide leach for the gold/platinum group.

8) After the resin extraction using ion exchange is complete, the resin is eluted with thiourea and regenerated with hydrochloric acid.

9) Silver leaching; sodium thiosulfate ($Na_2O_2S_3-5H_2O$) is used to leach the silver halide minerals. Because the concentration of "Hypo" determines the silver content of the preg and low concentrations of "Hypo" are used, continuous electromotive replacement occurs using powdered zinc and a DE filter system, similar to a Merrill-Crowe recovery system, but without de-aeration. The silver pregnants and barrens are monitored with an atomic absorption unit. When the silver has been recovered from the pulped concentrates, the solution is recovered from the pulped concentrates, the solution is pumped to an overhead storage tank to be used for the next silver cycle and the concentrate pulp is then used for the final gold-platinum group leaching cycle.

The methods of the present invention have the following anticipated benefits and successful utilization of the HRTS would result in the following:

1) Small mines could afford this system for processing their ores/concentrates, therefore economically harvesting ore reserves to small for large mining companies;

2) Large mining companies could reduce their initial capital investment and higher unit operating costs of their presently used pyrometallurgical system(s); maximizing their profits;

3) Higher recoveries and consequential higher profits per ton of ore processed could be achieved at most scales of production; 100 #/hour to 10 tons/hour. Also, these reaction towers are modular allowing large hourly production rates;

4) Deleterious elements can be removed in a detoxification state, either as an end-clean-up for effluent or as the prime objective;

5) Some rare or trace elements could be economically recovered which would also help reduce our dependence on imports;

6) The use of the bromine and chlorine compounds can replace conventional toxic chemicals.

Since various modifications can be made in the invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of oxidizing particles comprising mixing the particles with water to form an aqueous-slurry; providing a downwardly sloping raceway having an upper end and a lower end; providing a catchment tank at the lower end; for a time period, continuously pumping the slurry from the catchment tank to the upper end such that, during the time period, the slurry repeatedly flows over the raceway to the catchment tank; and providing on the raceway a plurality of longitudinally spaced riffles thus generating turbulent flow in the slurry on the raceway; and communicating the turbulent flow with oxygen so as to oxidize the particles.

2. The method according to claim 1 wherein each of the riffles extends transversely across the raceway from one side wall to an opposed side wall.

3. The method according to claim 1 wherein the height of the riffles is arranged relative to the depth of the slurry on the raceway so as to cause turbulent flow in all of the slurry on the raceway.

4. The method according to claim 3 including injecting air into the slurry in the catchment tank.

5. The method according to claim 1 including applying heat to the slurry so that it is heated above ambient temperature as it passes down the raceway.

6. The method according to claim 1 including providing high frequency vibration transducers on an underside of the raceway so as to inject the high frequency vibrations into the slurry.

7. The method according to claim 6 wherein the vibrations are ultrasonic.

8. The method according to claim 6 wherein the transducers include transducers adjacent the lower end for vibrating the slurry substantially immediately before entry into the catchment tank.

9. The method according to claim 1 including providing a return pipe from the pump to the upper end, the return pipe including turbulence means for generating high shear forces in the slurry flow within the return pipe.

10. The method according to claim 9 wherein the turbulence means comprises means defining a plurality of parallel ducts forming a part of the return pipe through which the slurry passes arranged to slow the flow rate of the slurry and means for injecting air into the parallel ducts to generate turbulence within the ducts.

11. A method of separating metals from ore comprising providing the ore in particle form; mixing the particles with water to form an aqueous slurry; providing a downwardly sloping raceway having an upper end and a lower end; providing a catchment tank at the lower end; for a time period, continuously pumping the slurry from the catchment tank to the upper end such that, during the time period, the slurry repeatedly flows over the raceway to the catchment tank; and providing on the raceway a plurality of longitudinally spaced riffles thus generating turbulent flow in the slurry on the raceway, and communicating the turbulent flow with oxygen so as to oxidize the particles; adding leaching compounds to form the metals into soluble salts; decanting the slurry from the catchment tank into a settling tank and causing the particles to settle from the water and the soluble salts in the settling tank; separating the water and soluble salts from the settling tank and extracting the soluble salts from the water.

12. The method according to claim 11 wherein each of the riffles extends transversely across the raceway from one side wall to an opposed side wall.

13. The method according to claim 11 wherein the height of the riffles is arranged relative to the depth of the slurry on the raceway so as to cause turbulent flow in all of the slurry on the raceway.

14. The method according to claim 13 including injecting air into the slurry in the catchment tank.

15. The method according to claim 11 including applying heat to the slurry so that it is heated above ambient temperature as it passes down the raceway.

16. The method according to claim 11 including providing high frequency vibration transducers on an underside of the raceway so as to inject the high frequency vibrations into the slurry.

17. The method according to claim 16 wherein the vibrations are ultrasonic.

18. The method according to claim 16 wherein the transducers include transducers adjacent the lower end for vibrating the slurry substantially immediately before entry into the catchment tank.

19. The method according to claim 11 including providing a return pipe from the pump to the upper end, the return pipe including turbulence means for generating high sheer forces in the slurry flow within the return pipe.

20. The method according to claim 19 wherein the turbulence means comprises means defining a plurality of parallel ducts forming a part of the return pipe through which the slurry passes arranged to slow the flow rate of the slurry and means for injecting air into the parallel ducts to generate turbulence within the ducts.

21. The method according to claim 11 including providing magnetic separators on the raceway so as to collect magnetic particles on the magnetic separators on the raceway.

22. The method according to claim 11 wherein the leaching compounds include sodium chloride or sodium bromide.

23. The method according to claim 11 wherein the leaching compounds include a chlorine based oxidizing agent or calcium hypochloride.

24. The method according to claim 11 wherein the leaching compounds include a bromine compound and hydrochloric acid.

25. The method according to claim 11 wherein the leaching compounds include sodium chloride, a chlorine based oxidizing agent, a bromine compound and hydrochloric acid.

26. The method according to claim 11 wherein the soluble salts are extracted from the water by ion exchange columns using selected resins within the columns for extracting pre-determined metals.

27. The method according to claim 26 including eluting the metals from the resins using a thiourea complex.

* * * * *